(12) United States Patent
Islam

(10) Patent No.: US 8,463,033 B2
(45) Date of Patent: Jun. 11, 2013

(54) EFFICIENT CONTENT COMPRESSION AND DECOMPRESSION SYSTEM AND METHOD

(75) Inventor: Asad Islam, Richardson, TX (US)

(73) Assignee: The Modern Video Company, Mountain View, CA (US)

(*) Notice: Subject to any disclaimer, the term of this patent is extended or adjusted under 35 U.S.C. 154(b) by 0 days.

(21) Appl. No.: 13/323,782

(22) Filed: Dec. 12, 2011

(65) Prior Publication Data

US 2012/0106626 A1 May 3, 2012

Related U.S. Application Data

(63) Continuation of application No. 11/605,892, filed on Nov. 28, 2006, now Pat. No. 8,077,990.

(60) Provisional application No. 60/795,822, filed on Apr. 28, 2006, provisional application No. 60/816,115, filed on Jun. 22, 2006.

(51) Int. Cl.
  *G06K 9/00* (2006.01)
(52) U.S. Cl.
  USPC ............... 382/166; 382/232; 375/240.03
(58) Field of Classification Search
  USPC .............................................. 382/166
  See application file for complete search history.

(56) References Cited

U.S. PATENT DOCUMENTS

| | | | |
|---|---|---|---|
| 5,596,659 A | 1/1997 | Normile et al. | |
| 5,703,799 A * | 12/1997 | Ohta | 708/402 |
| 6,016,360 A | 1/2000 | Nguyen et al. | |
| 6,052,205 A | 4/2000 | Matsuura | |
| 6,463,178 B1 | 10/2002 | Kondo et al. | |
| 6,697,521 B2 | 2/2004 | Islam et al. | |
| 6,792,153 B1 | 9/2004 | Tsujii | |
| 7,149,811 B2 | 12/2006 | Wise et al. | |
| 7,791,508 B2 * | 9/2010 | Wegener | 341/61 |
| 2001/0041011 A1 | 11/2001 | Passaggio et al. | |
| 2001/0048770 A1 | 12/2001 | Maeda | |
| 2003/0002734 A1 | 1/2003 | Islam et al. | |
| 2003/0202581 A1 | 10/2003 | Kodama | |
| 2005/0063599 A1 | 3/2005 | Sato | |
| 2006/0115166 A1 | 6/2006 | Sung et al. | |

OTHER PUBLICATIONS

International Search Report, PCT/US07/10706, Sep. 15, 2008.
Written Opinion, PCT/US07/10706, Sep. 15, 2008.
International Search Report, PCT/US09/48181, Jul. 23, 2009.
Written Opinion, PCT/US09/48181, Jul. 23, 2009.

\* cited by examiner

*Primary Examiner* — Hadi Akhavannik
(74) *Attorney, Agent, or Firm* — DLA Piper LLP (US)

(57) ABSTRACT

A content compression/compression system and method are disclosed in which a pre-processing step is performed before any compression and a post-processing step is performed once a compressed piece of content is decompressed.

32 Claims, 16 Drawing Sheets

| IMAGE | RESOLUTION | MEGA-PIXEL | ORIGINAL JPEG FILE SIZE (KB) | PIXSENSE FILE SIZE (KB) | PIXSENSE BIT RATE (BITS/PEL) | % SAVINGS OVER JPEG |
|---|---|---|---|---|---|---|
| | 2418X3225 | 7.8 | 6,662 | 944 | 0.9691 | 85.82% |
| | 2355X3141 | 7.4 | 4,470 | 646 | 0.6992 | 85.54% |
| | 2136X2484 | 5.3 | 5,137 | 642 | 0.9685 | 87.50% |
| | 1688X2222 | 3.8 | 3,583 | 371 | 0.7918 | 89.64% |
| | 1688X2222 | 3.8 | 3,826 | 506 | 1.0801 | 86.77% |

FIG. 15

| IMAGE | RESOLUTION | MEGA-PIXEL | ORIGINAL JPEG FILE SIZE (KB) | PIXSENSE FILE SIZE (KB) | PIXSENSE BIT RATE (BITS/PEL) | % SAVINGS OVER JPEG |
|---|---|---|---|---|---|---|
| | 2150X2800 | 6 | 2,823 | 393 | 0.5232 | 86.05% |
| | 2150X2800 | 6 | 2,552 | 401 | 0.5332 | 84.28% |

FIG. 16

| ORIGINAL IMAGE (24 PBB) | RESOLUTION | MEGA-PIXEL | ORIGINAL JPEG FILE SIZE (KB) | PIXSENSE FILE SIZE (KB) | PIXSENSE BIT RATE (BITS/PEL) | % SAVINGS OVER JPEG |
|---|---|---|---|---|---|---|
|  | 1024X768 | 0.8 | 756 | 145 | 1.4765 | 80.80% |
|  | 1024X768 | 0.8 | 582 | 90 | 0.9237 | 84.41% |
|  | 1024X768 | 0.8 | 767 | 140 | 1.4302 | 81.68% |
|  | 2136X2484 | 5.3 | 4,045 | 852 | 1.2847 | 78.94% |
|  | 1024X768 | 0.8 | 498 | 56 | 0.5744 | 88.67% |

| ORIGINAL IMAGE (24 PBB) | RESOLUTION | MEGA-PIXEL | ORIGINAL JPEG FILE SIZE (KB) | PIKSENSE FILE SIZE (KB) | PIKSENSE BIT RATE (BITS/PEL) | % SAVINGS OVER JPEG |
|---|---|---|---|---|---|---|
| | 1024X768 | 0.8 | 640 | 95 | 0.9737 | 85.06% |
| | 768X1024 | 0.8 | 843 | 174 | 1.7751 | 79.32% |
| | 1024X768 | 0.8 | 632 | 96 | 0.9825 | 84.72% |
| | 768X1024 | 0.8 | 784 | 178 | 1.8132 | 77.27% |
| | 2848X2136 | 5.3 | 3,260 | 1,074 | 1.4127 | 67.05% |

FIG. 18

| ORIGINAL IMAGE (24 PBB) | RESOLUTION | MEGA-PIXEL | ORIGINAL JPEG FILE SIZE (KB) | PIXSENSE FILE SIZE (KB) | PIXSENSE BIT RATE (BITS/PEL) | % SAVINGS OVER JPEG |
|---|---|---|---|---|---|---|
|  | 2136X2484 | 5.3 | 3,880 | 751 | 1.1327 | 80.64% |
|  | 1024X768 | 0.8 | 591 | 87 | 0.8886 | 85.23% |
|  | 2848X2136 | 5.3 | 2,922 | 595 | 0.7828 | 79.63% |
|  | 768X1024 | 0.8 | 714 | 127 | 1.2957 | 82.16% |
|  | 768X1024 | 0.8 | 654 | 107 | 1.0959 | 83.55% |

| ORIGINAL IMAGE (24 PBB) | RESOLUTION | MEGA-PIXEL | ORIGINAL JPEG FILE SIZE (KB) | PIXSENSE FILE SIZE (KB) | PIXSENSE BIT RATE (BITS/PEL) | % SAVINGS OVER JPEG |
|---|---|---|---|---|---|---|
|  | 1024X768 | 0.8 | 751 | 145 | 1.4792 | 80.65% |
|  | 1024X768 | 0.8 | 584 | 92 | 0.9380 | 84.23% |
|  | 2848X2136 | 5.3 | 3,309 | 945 | 1.2435 | 71.43% |
|  | 1024X768 | 0.8 | 674 | 120 | 1.2226 | 82.18% |
|  | 768X1024 | 0.8 | 755 | 145 | 1.4814 | 80.73% |

EFFICIENT CONTENT COMPRESSION AND DECOMPRESSION SYSTEM AND METHOD

RELATED APPLICATIONS/PRIORITY CLAIMS

This application claims priority to under 35 USC 120 and is a continuation of U.S. patent application Ser. No. 11/605,892, filed on Nov. 28, 2006 and entitled "Efficient Content Compression and Decompression System and Method," which application in turn claims priority under 35 USC 119(e) and 120 to U.S. Provisional Patent Application Ser. Nos. 60/795,822, filed on Apr. 28, 2006 and entitled "Efficient Content Compression and Decompression System and Method" and 60/816,115, filed on Jun. 22, 2006 and entitled "Pre-processing of Information for Efficient Data Compression", all of which are incorporated herein by reference.

FIELD OF THE INVENTION

The invention relates generally to a content compression and decompression system that may include pre-processing and post-processing of the content (digital data such as images, video, audio, etc.) to make the content more conducive for compression, without compromising the perceived quality of the information data to the human observer.

BACKGROUND OF THE INVENTION

Content, such as digital data, is comprised of bytes of information, with each byte representing, in some sense, a sample of source data at a particular point in time and/or space. There is usually some type of redundancy in such data. As is well known, this fact is used to compress the data to make it more efficient for data transmission and storage.

In addition to data redundancy, data importance is another factor present in such data. In other words, some parts of the data are more important than others, from the point of view of human perception of the data.

One type of content is digital images. Digital images are comprised of pixels, with each pixel represented by one or more bytes of information. For typical color images, 3 color components (usually Red, Green and Blue) are needed, with each component typically represented by one byte of information. Hence, color images can be adequately represented by 3 bytes of information for every pixel in the image.

The number of pixels in an image is determined by the resolution of the image. A 1-MegaPixel image contains one million pixels. The amount of information carried by a 1-Mega Pixel color image is, therefore, of the order of 3 Megabytes. Today's digital cameras generate images much higher in resolution. A 6-Mega Pixel color image would translate to about 18 MB of data.

Since digital images carry so much information and take up lots of space, it is only natural that techniques are developed to compress the large of amount of image data. There are several image compression techniques that have evolved over time. Some of the popular standardized image compression standards are GIF, JPEG and JPEG2000. JPEG, for example, is able to compress a typical high resolution digital camera image to a ratio of 1:8 to 1:12, depending on the image content. Thus, instead of requiring 18 MB for a 6-Mega Pixel image, the compressed image requires a space of about 1.5-2.5 MB.

However, it is desirable to provide some pre-processing and post-processing that can provide further compression to a piece of content on top of that provided by the typical image compression standards and it is to this end that the invention is directed.

SUMMARY

The system and method provide efficient content compression in which a piece of content is pre-processed (prior to encoding/compression) in order to reduce the effects of less important data such that the human perception of the data is not compromised, yet at the same time, making the data more conducive for efficient compression. The pre-processing works with many kinds of content, such as images, videos, audio, etc. In one illustrative embodiment, a digital image is the piece of content that is pre-processed using the system.

BRIEF DESCRIPTION OF THE DRAWINGS

FIGS. 14-20 are tables illustrating compression using the pre-processing and post-processing as compared to typical compression schemes for different resolution digital images;

DETAILED DESCRIPTION OF AN EMBODIMENT

Figure 1:
FIG. 1 is an example of a grayscale representation of a high resolution 3 Megapixel color digital camera image.
Figure 2:
FIG. 2 illustrates a grayscale representation of bit-plane 7 of the image shown in FIG. 1.
Figure 3:
FIG. 3 illustrates a grayscale representation of bit-plane 6 of the image shown in FIG. 1.
Figure 4:
FIG. 4 illustrates a grayscale representation of bit-plane 5 of the image shown in FIG. 1.
Figure 5:
FIG. 5 illustrates a grayscale representation of bit-plane 4 of the image shown in FIG. 1.
Figure 6:
FIG. 6 illustrates a grayscale representation of bit-plane 3 of the image shown in FIG. 1.
Figure 7:
FIG. 7 illustrates a grayscale representation of bit-plane 2 of the image shown in FIG. 1.
Figure 8:
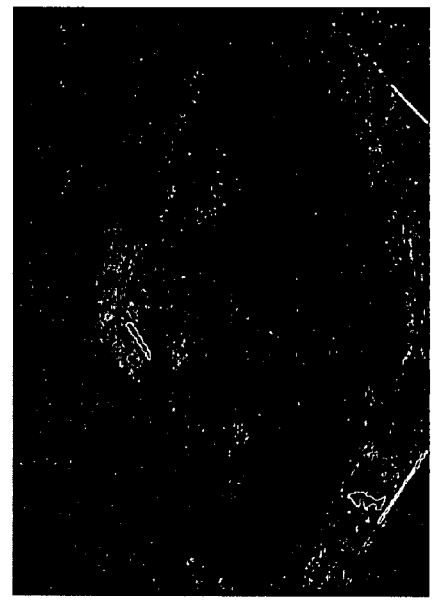
FIG. 8 illustrates a grayscale representation of bit-plane 1 of the image shown in FIG. 1.
Figure 9:
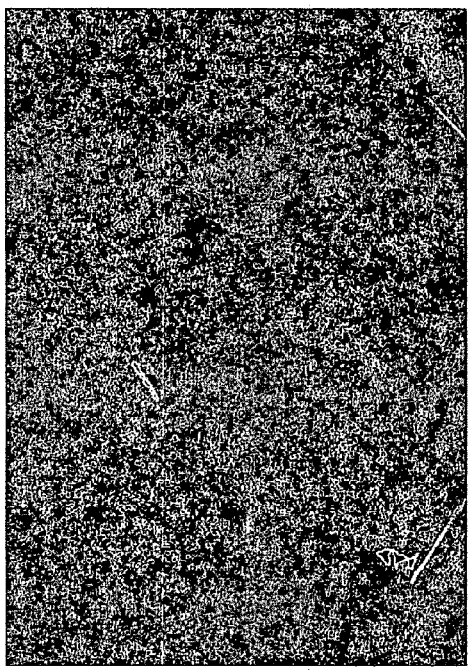
FIG. 9 illustrates a grayscale representation of bit-plane 0 of the image shown in FIG. 1.
Figure 10:
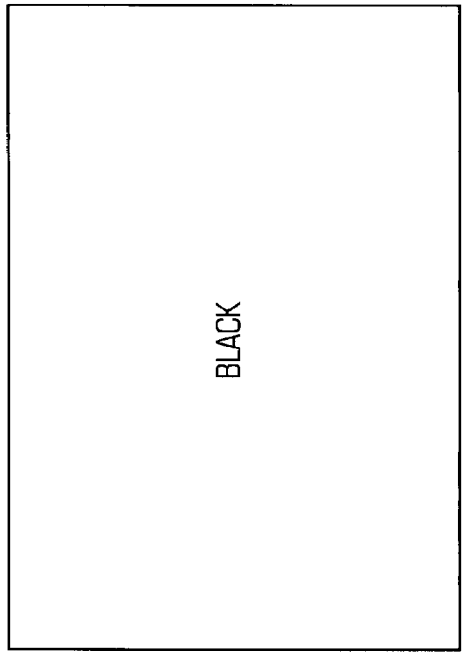
FIG. 10 shows an example of a grayscale representation of suppressed bit plane 0 using the pre-processing method in accordance with the invention.

The invention is particularly applicable to the compression and decompression of content and digital data and it is in the context of digital images that the system and method will be described below for illustration purposes. However, the system and method is not limited to digital images and may be used to compress and decompress other types of digital data and content. In particular, the system and method may be used for other types of content, such as audio, video, color still images and any other type of content or digital data that can be compressed using various known compression methods. Furthermore, the system and method are described, for illustration purposes as implemented in a typical standalone personal computer system that contains a piece of compression/decompression software that includes the pre-processing and post-processing techniques. However, the system and method can be implemented in software, hardware or a combination of hardware and software. In addition, the system and method can be implemented on any computing device with sufficient processing power and memory to execute the pre-processing and/or post-processing methods and may be implemented as a hardware device or as a software application. The system and method can also be implemented as a piece of hardware, USB key, external storage device, ASIC, PLA, ROM, EEPROM, flash memory and/or an integrated circuit that can be accessed by a processing unit.

An overview of typical image compression techniques is provided first to provide some context for the description of the content compression/decompression system. Image data compression aims to reduce the size of raw data by de-correlating the data and removing redundancies in it. The better the de-correlation, the more efficient is the resulting compression. De-correlation is performed by using an appropriate mathematical transformation, such as the Discrete Cosine Transform, the Discrete Wavelet Transform, the Discrete Haar Transform, etc.

The de-correlation mechanism packs the energy of the original data into fewer data samples so that the data is represented in a more compact form. If there is less variation (and more uniformity) in data, it will be packed to a greater extent (i.e. lesser data samples). High variations in the source data make it harder to pack the data efficiently. Hence, random data structure, such as that found in white noise, is very hard to de-correlate and consequently, very hard to compress efficiently.

The above statement can be analyzed from information theoretic point of view as well. The entropy of a data source is a measure of the randomness of the data. The higher the entropy of a data source, the harder or less efficient it is to compress the data. According to well established facts of information theory, the entropy of an unpredictable, random-like data is more than that of a predictable, structured data. In other words, it is less efficient to compress data that is random in nature as opposed to data that has meaningful structure and correlation.

Using the above principles, the data present in a typical image can be understood. In particular, the data representing the pixels in the image can be broken down in terms of a number of bits that represent the image. For the sake of simplicity, consider a grayscale image with every pixel represented by one byte, or 8 bits, of information. Thus, the image has 8 bit-planes, with each bit-plane being a collection of the same bit location for every pixel in the image. For a color image or a different piece of content, the number of bit-planes may be different, but the same data representation method would apply equally to other pieces of content.

The information carried in the various bit-planes of an image is not the same, just as the information carried in the various bits of a byte is not the same. For example, the MSB (Most Significant Bit) of a byte carries the most weight, and consequently, the most information, whereas the LSB (Least Significant Bit) carries the least weight and the least information. Likewise, the information carried in the most significant bit-plane of an image (bit-plane 7 for the above grayscale example) is much more than the information carried in the least significant bit-plane.

In addition to the amount of information carried in the various bit-planes of an image, the nature of the data in each bit-plane is also different. In particular, the bits in the higher bit-planes are much more highly correlated to each other than the ones in the lower bit-planes. Thus, the higher bit-planes carry data that is structured and carries meaningful information while the data carried in the lower bit-planes is more random in nature and carries less information.

To illustrate the nature of the data in each bit-plane, it is easiest to look at an image and then look at the various bit-planes for that image. FIG. 1 shows a high resolution 5.2 Mega Pixel (2920×1876) digital camera color image (downscaled and greyscaled here for presentation purposes) while FIGS. 2-9 show the greyscaled version of the color information carried (contained) in the bit-planes 7, 6, 5, 4, 3, 2, 1, and 0 of the original image. For the color image, the image is divided into 3 bytes or color components—R, G, B—with each byte or color component having 8 bit-planes. It can be seen that bit-plane 7 (FIG. 2) carries highly structured data with lots of visual information. As we go towards the 0 bit plane, the bit plane contains relatively weaker structure and lesser meaningful information so that the least significant bit-plane, bit-plane 0 in FIG. 9, seems to have no structure at all and behaves almost like random white noise. The visual information carried in the 0 bit-plane has very little contribution. Now, a system and method that pre-processes and then compresses the pre-processed content and/or a system and method that decompress a compressed pre-processed piece of content and then post-processes the content is now described.

Figure 11:
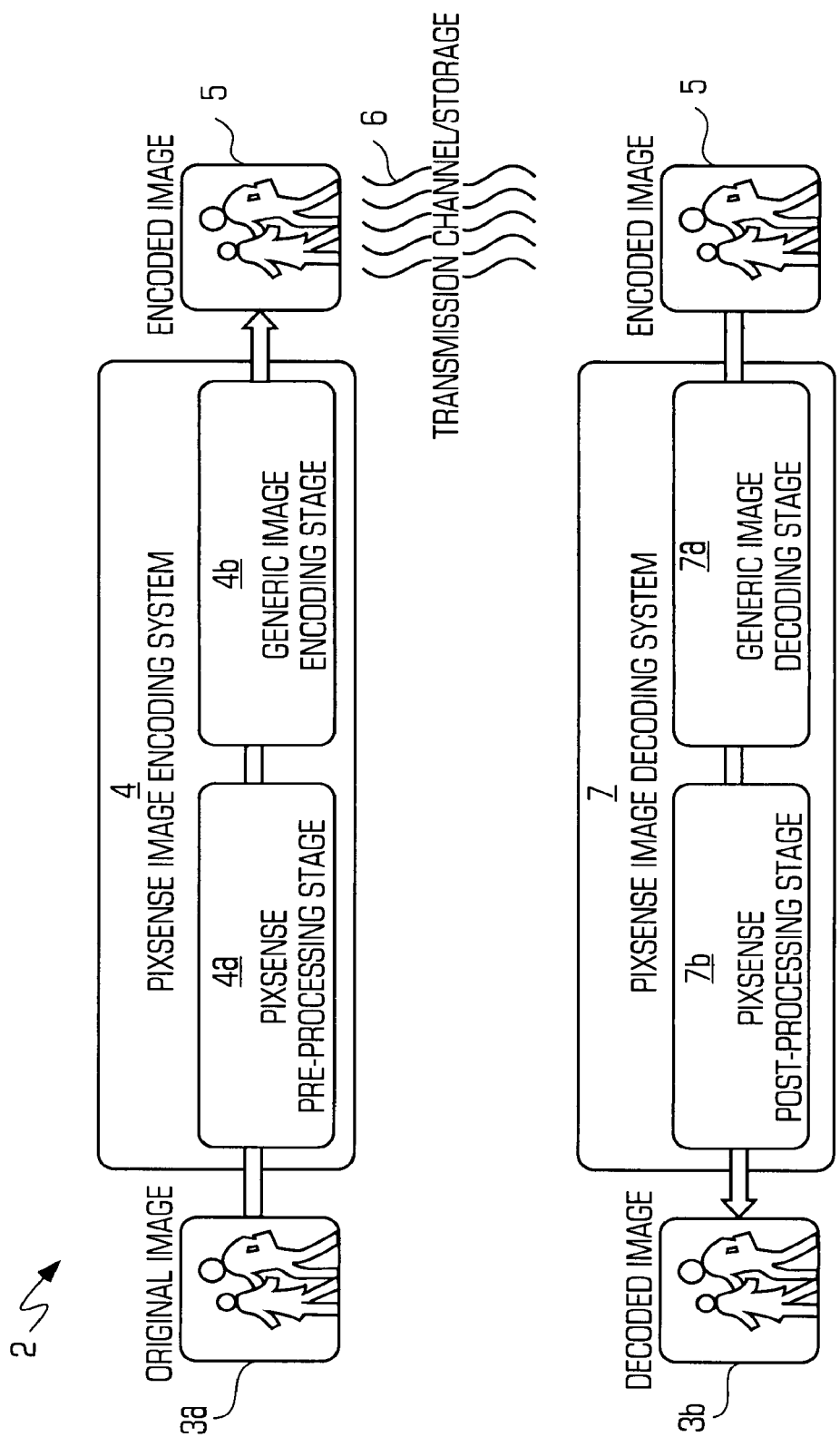
FIG. 11 illustrates an example of a content compression and decompression system that includes pre-processing and post-processing steps.

FIG. 11 illustrates an example of a content compression and decompression system 2 that includes the novel pre-processing and post-processing units. A piece of content 3a, such as a digital image, is fed into the system and a decoded piece of content 3b, a digital image in one example, results at the end of the process in which the piece of content is encoded by an encoding unit 4, the encoded piece of content 5 is transmitted over a communications channel 6, and the encoded piece of content 5 is then decoded by a decoding unit 7 which results in the decoded piece of content 3b. The encoding unit 4 may further comprises a pre-processing unit/stage 4a (that may be implemented in software code running on a processing unit in an exemplary embodiment such as that shown in FIG. 12) that performs a pre-processing step on the piece of content that is described below in more detail with reference to FIG. 13A. The encoding unit 4 may further comprise a content encoder unit/stage 4b that may be any unit/technique that compresses/encodes content since the pre-processing unit can be used with any known or yet to be developed compression/encoding process or system. In other words, a content encoding system with the pre-processing unit is not limited to any particular encoding unit. The pre-processing unit and the encoding unit each may be implemented as one or more lines of computer code that are executed by a processing unit of a computer system or alternatively, each may be a hardware circuit/device, such as USB key, external storage device, ASIC, PLA, ROM, EEPROM, flash memory and/or an integrated circuit that can be accessed by a processing unit. The decoding unit 7 may further comprises a decoder unit/stage 7a and a post-processing unit/stage 7b that is described in more detail below with reference to FIG. 13B. The post-processing unit and the decoder unit each may be implemented as one or more lines of computer code that are executed by a processing unit of a computer system or alternatively, each may be a hardware circuit/device, such as USB key, external storage device, ASIC, PLA, ROM, EEPROM, flash memory and/or an integrated circuit that can be accessed by a processing unit. As above, any unit/technique that decodes an image may be used with the post-processing unit so that a content decoding system with the post-processing unit is not limited to any particular decoding unit. When a system that both encodes and decodes content incorporates the pre-processing and post-processing units as shown in FIG. 11, the encoding unit and the decoding unit must use the same process/method as is well known.

Figure 12:
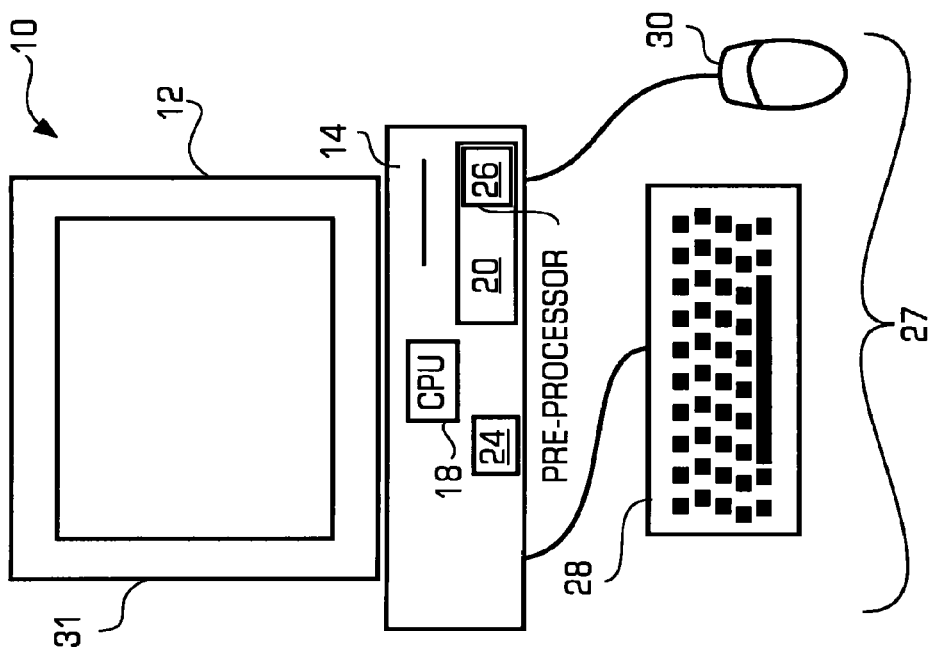
FIG. 12 illustrates an example of a content compression/decompression system implemented on a typical computer system.

FIG. 12 illustrates an example of a content encoding/decoding system implemented on a typical computer system 10. In the implementation shown in FIG. 12, the computer has a display device 12 and a chassis 14 wherein the chassis further comprises a processing unit 18, a memory 20 and a persistent storage device 24. To implement the content compression/decompression system, the memory may store a piece of software code 26 that implements the processes and methods that are described below with reference to FIGS. 13A and 13B. The computer system may also include a set of input devices 27, such as a keyboard 28 and mouse 30, that permit the user to interact with the computer system. As described above, the content encoding and/or decoding system and method is not limited to an implementation of the computer system shown in FIG. 12 since the system can be implemented on any computing device with sufficient processing power and memory to execute the methods described below. For example, the system can be implemented by other types of computer systems, such as servers and the like, as a piece of software code executed by various computing devices or may be implemented as a piece of hardware (DSP) or as code embedded onto various types of hardware devices so that the system is not limited to the implementation shown in FIG. 12. The system and method can also be implemented as a piece of hardware, USB key, external storage device, ASIC, PLA, ROM, EEPROM, flash memory and/or an integrated circuit that can be accessed by a processing unit.

The pre-processing method (implemented in the pre-processing unit shown in FIG. 11) takes advantage of an awareness of the data in a piece of content that causes the largest bottleneck in content compression. The pre-processing method involves a pre-processing of the piece of content prior to any compression/encoding of the piece of content. During the pre-processing certain portions of the piece of content (digital data) are removed. Two constraints on the portions of the digital data to pre-process are necessary in order to achieve efficient compression which include 1) the data should not be perceptually important to the human visual system (i.e., human eye); and 2) the data should contribute to a substantial portion of the overall bit budget of the compressed file size.

As discussed above, typical natural images contain data that can be classified as having both meaningful, structured information as well as having less meaningful, less structured information. As stated before, information that is less structured (and more random in nature) is much harder to compress. By targeting data that is less meaningful and less structured and throwing away part of it that contributes more to the overall budget of the compressed file size, we are, in effect, removing the data that impacts the compressed file size the most. In other words, we will be able to achieve big gains in file size reduction by removing such data from the image before compression. At the same time, note from FIG. 9 that this data carries the least weight (least significant bit-plane) and has very little useful information. Removing this data incurs minimal visual information loss so that the visual quality of the image is not compromised. By following the above two constraints, the invention makes sure that the best possible compression is achieved without degrading the visual quality of the image. Now, the specific methods are described in more detail.

Figure 13B:
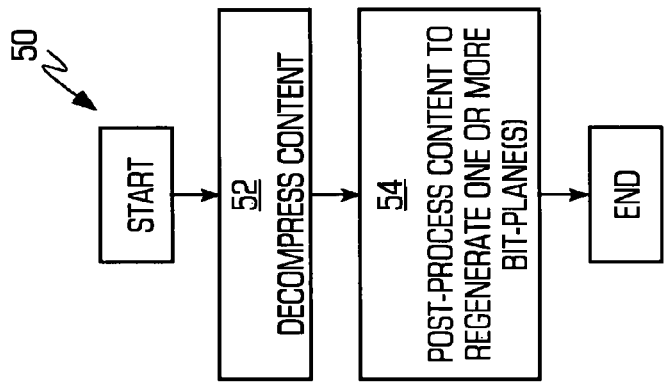
FIG. 13B illustrates a content decompression method that incorporates post-processing.
Figure 13A:
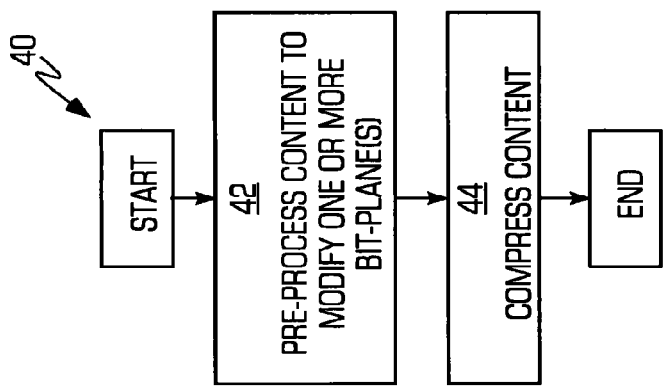
FIG. 13A illustrates a content compression method that incorporates pre-processing.

FIG. 13A illustrates a content compression/encoding method 40 that incorporates pre-processing. In step 42, the method of the system preprocesses the piece of content (a digital image in the example used) to modify one or more bit-planes of the content to improve the efficiency of any compression scheme that is used with the pre-processing. The least significant bit-plane of the piece of content carries very little information and is the hardest to compress due to its weak structure so removing it does not affect the visual quality of the content but gives tremendous gains in compression. Thus, the method removes this bit-plane altogether from the piece of content. For example, bit-plane 0 of FIG. 9 could be eliminated entirely by removing it from the image. This mechanism will not affect the visual quality of the content as discussed below with reference to FIGS. 21A, 21B, 22A and 22B.

The resulting piece of content has less data, especially weak-structured, random-like data, and is more amenable to compression by any encoding/compression scheme in step 44. As discussed above, the pre-processing method can be used with any encoding/compression scheme since the suppression of the bit planes will benefit any compression scheme. The compressed data is then either stored or transmitted over a channel to the receiving end where it must be recovered back to its original form.

During the pre-processing process, more than one least significant bit-plane can be removed during the pre-processing stage. In that case, the information loss is more and may cause visually perceptible degradations in the piece of content. On the other hand, it will increase the compression efficiency of the piece of content even more. In most implementations, the number of bit planes to remove during the pre-processing may be a user adjustable variable with the trade-off between the perceived image quality and the compressed file size (with fewer bit-planes removed resulting in better visual quality when the piece of content is an image, but with a larger compressed file size.) In the pre-processing embodiment described above, the least significant bit plane is removed altogether. However, the suppression of the least significant bit-plane(s) may be done in various manners that are within the scope of the system.

In a second embodiment, pre-processing involves suppressing the data in the least significant bit-plane of the image. In other words, the method changes the highly random nature of the least significant bit-plane of the image to a highly predictive one. Since entropy of a data set is a function of its randomness, removing randomness from a data set will lower its entropy and result in better compression of the data. This could be done, for example, by changing all the random bits in the least significant bit-plane to an arbitrarily fixed value, such as 0 or 1 (Note that the entropy of an all-zero or all-one bit-plane is 0 bits/pel, which is the minimum possible, while that of pure white noise is 1 bit/pel, which is the maximum).

However, there can be other arbitrary mechanisms for changing the bits in the bit-plane, say by using arbitrary models or patterns. This invention covers all mechanisms for bit-plane data suppression and manipulation. In addition, the suppression of bit-planes is not restricted to bit-plane 0 although that is the example set forth above. For example, as seen from FIGS. 8 and 7, bit-planes 1 and 2 also have quite a bit of randomness in them so that suppressing these bit-planes will also achieve significant gains in image compression. The suppression of higher significant bit-planes, however, risks impacting the visual quality of the image.

The method shown in FIG. 13A performs pre-processing of the piece of content (before it is compressed) to make it more conducive for data compression. As such, the system and method are not tied to any particular compression scheme. For example, the system can be used with any type of content (such as image, audio, video, etc.) and with most compression scheme, such as JPEG, JPEG2000, etc. for images, Motion JPEG, Motion JPEG2000, H.263, MPEG-4, H.264, etc. for video, MP3, AMR, AAC, etc. for audio, and other compression schemes for other types of data.

The spirit of the system and method dictates that any information that is sampled in time, space and/or any other dimension and stored in the form of bytes carries the kind of behavior that is suitable to be pre-processed using the system and method. Least significant bit-planes of such information samples behave like random noise and can be suppressed for better compression results without compromising the perceptual quality of the information. In short, the system and method can be used to process any type of lossy data compression scheme. The same mechanism that is used to process image data can be used to process video data, audio data, as well as other kinds of information data that are not specifically mentioned in this invention.

One of the advantages of the method is that it may not require any post-processing module at the decoder side to offset the pre-processing performed at the encoding side. This would be true, for example, for the case of the second embodiment when the least significant bit-planes are suppressed by forcing the bit in those least significant bit-planes to have some arbitrary values. In this case, the decoder decodes the compressed bit-stream and displays the decoded image with one or more of the bit planes being suppressed. For example, for the sake of simplicity, let's assume that only bit-plane 0 was suppressed. The decoded content will, therefore, have bit-plane 0 with all bits suppressed. However, since the weight of this bit-plane is very small, the visual impact of this change is insignificant and the perceived quality of the decoded content is not affected. In other words, the decoded content, a digital image in one example, will have a similar visual quality as the original content, without any post-processing required at the decoding stage.

However, the system and method may also incorporate a post-processing unit/process as shown in FIG. 13B. FIG. 13B shows a decompression/decoding method 50 that, once the piece of content is decoded/decompressed (52) using various decompression/decoding schemes, a post processing process 54 occurs in which the suppressed data is re-generated. The re-generation of the suppressed data could be done by changing the bits in the suppressed bit-plane by some mechanism, such as forcing all the bits to be 0 or 1, or using some model to simulate and re-generate noise data (such as white Gaussian noise, etc.), or some other method. The decompression/decoding method 50 covers all methods of post-processing to re-generate suppressed data. The post-processing may bring the piece of content back to a form similar to the original piece of content (See FIG. 11). Again, as in pre-processing, there can be more than one embodiment of the post-processing scheme.

In a first embodiment, where the least significant bit-plane was removed in the pre-processing stage, the post-processing may insert the missing information (i.e., least significant bit-plane) in the post-processing stage. There are various ways to insert the least significant bit-plane. The simplest way is to insert the bit-plane with all bits set to either 0 or 1. Statistically, since the nature of the bits in the least significant bit-plane is random, there is equal probability of having a 0 or a 1 in the original least significant bit-plane. Hence, the overall average distortion due to this bit-plane is the same whether we insert a 0-bit or a 1-bit. However, in case a particular region of the least significant bit-plane does not contain random bits but rather has some well-defined structure, then the distortion caused by the all-0 or all-1 bit mechanism will be localized and may become visually discernible.

Another method of inserting the least significant bit-plane is to insert the bit-plane such that the bits are randomly generated using a noise generating model, such as white noise, Gaussian noise or any other suitable model. The advantage is that the distortion, if present, will be distributed over the image and will not form any strong structure to make it discernible. Also, the random nature of the inserted bits closely mimics the random nature of the bits in the original least significant bit-plane.

If there is more than one bit-plane to insert, an optimal value for bits would be to take the average of the possible values that could be present in the inserted bit-planes. For example, if two bit-planes were removed, the inserted bit-planes can potentially have bits whose value ranges from 0-3 (2 bits). An optimum arbitrary value for setting the output bits would be to take the average or middle of the range of possible values. Hence, a value of 1 or 2 would give a lesser distortion, on average, than a value of 0 or 3. Alternatively, the bits could be generated according to some probability distribution, such as Gaussian or Laplacian, in order to minimize the overall distortion in the least significant bit-planes. The post-processing system and method are not limited to any particular method of data distribution inside the inserted bit-planes. Rather, it is more related to inserting the least significant bit-planes in a way such that the overall distortion of the image is reduced. In that respect, any distribution or model can be used to efficiently distribute the data in the inserted least significant bit-planes.

In summary, the post-processing method and system (as well as the decoding/decompression unit that incorporates the post-processing) covers all arbitrary methods of post-processing to re-generate inserted data as a means to offset the removed or suppressed data, as well as the mechanism that does not involve any post-processing at the decoding side.

FIGS. 14-20 are tables illustrates a compression using the pre-processing and post-processing as compared to typical compression schemes for different resolution digital images. In particular, these figures illustrate the compression results achieved with different resolution images using the system and method described above. The system and method typically result in a compression gain of 60%-80% over JPEG compressed size for most images captured from high quality image acquisition devices such as digital cameras. Lower picture quality with noise and graininess will result in lower compression gains. Very high quality images will result in compression gains of over 80% without perceptual degradation in image quality. As expected, compression gain is dependent on the image content.

All images shown in these figures are images where the 24 bits/pel JPEG file size indicates the original JPEG file size created by the acquisition device. The file size generated by the system and method (file size using the invention) indicates the size of the compressed file created from the original JPEG file using the system and method with pre-processing. The Bit rate indicates the average bits/pel used for compression using the system and method with pre-processing.

Figure 14:
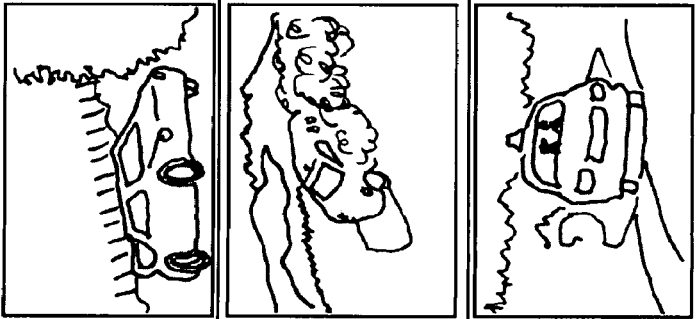
Figure 17:
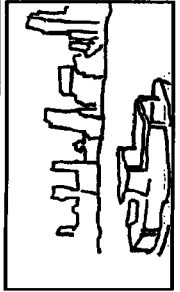
Figure 17:
Figure 17:
Figure 17:
Figure 17:
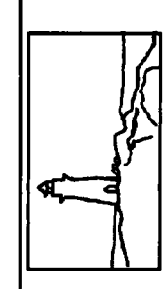
Figure 19:
Figure 19:
Figure 19:
Figure 19:
Figure 19:
Figure 20:
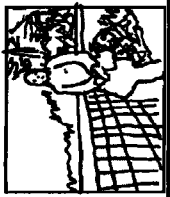
Figure 20:
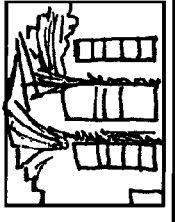
Figure 20:
Figure 20:
Figure 20:
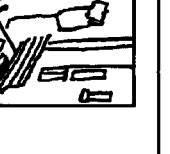

FIGS. 14-16 show high resolution images with resolution from 4 Mega Pixels to 8 Mega Pixels. All images are 24 bits/pel. The images are captured using high-end commercially available digital cameras. The content varies but is typical of user-generated content. The compression results for the system and method with pre-processing on the high resolution image set is shown and it is seen that the compression gain over typical JPEG compression is close to 80% for most images and the visual quality of the images is not compromised.

FIGS. 17-20 show medium resolution images with resolution from 0.75 Mega Pixels to 5 Mega Pixels. The images are captured using Fuji Film FinePix F10 Zoom digital camera. The content varies but is typical of user-generated content. The compression results for the system and method with pre-processing on the medium resolution image set is shown and it is seen that the compression gain over typical JPEG compression is close to 67% to 88% and the visual quality of the images is not compromised.

Figure 21A:
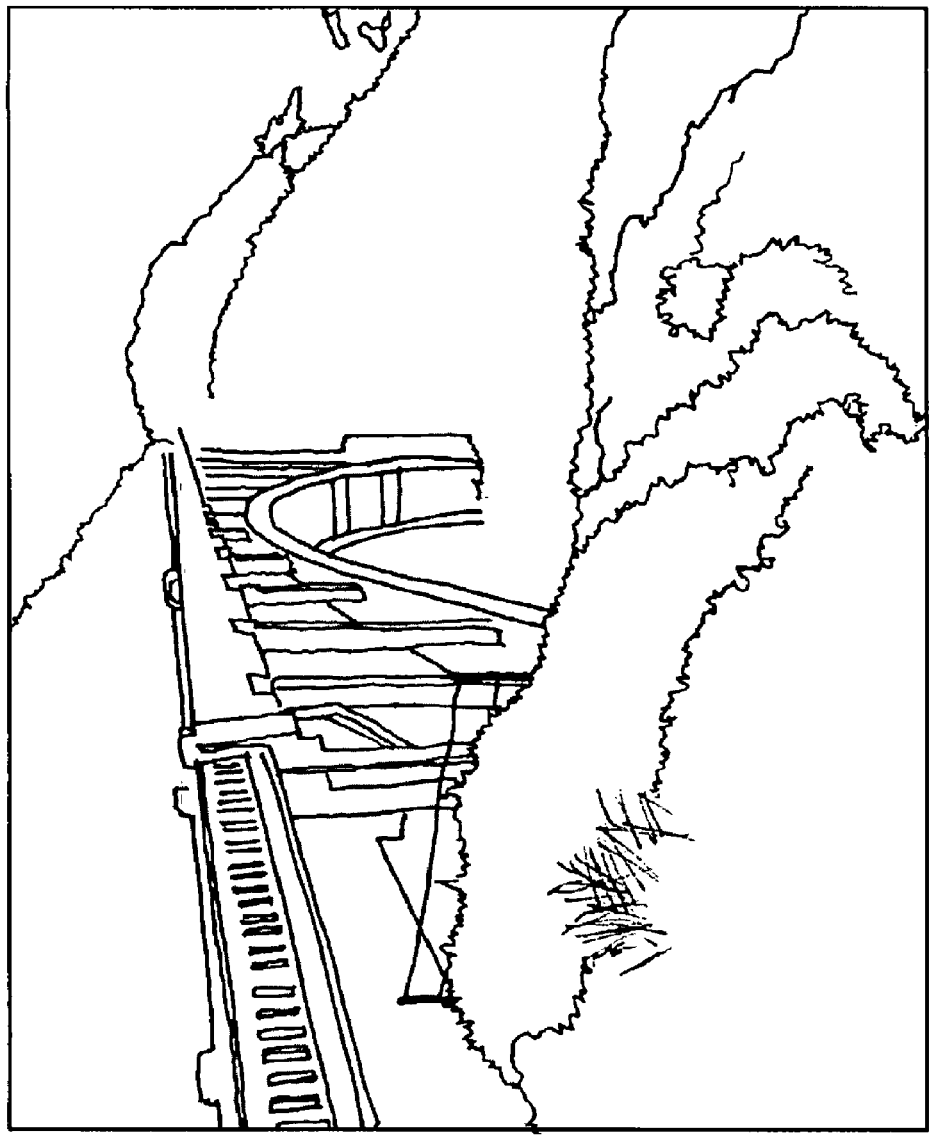
FIGS. 21A and 21B illustrate an example of the visual quality of a digital image compared to an image compressed using the pre-processing and post-processing.
Figure 21B:
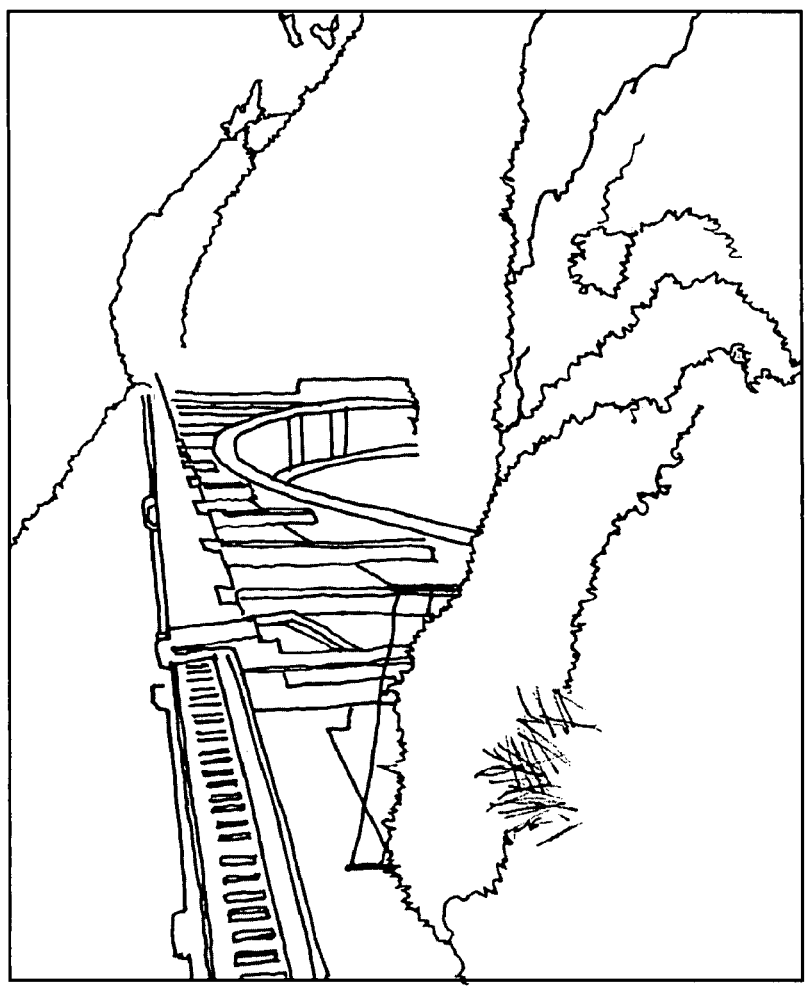
Figure 22A:
FIGS. 22A and 22B illustrate another example of the visual quality of a digital image compared to an image compressed using the pre-processing and post-processing.
Figure 22B:

FIGS. 21A and 21B illustrate an example of the visual quality of a digital image compared to an image compressed using the pre-processing and post-processing and FIGS. 22A and 22B illustrate another example of the visual quality of a digital image compared to an image compressed using the pre-processing and post-processing. As shown in these figures (with FIGS. 21A and 22A being the original JPEG images with a file size of 1429 Kb and 1163 Kb, respectively and FIGS. 21B and 22B being the pre-processed image with a file size of 464 Kb and 200 Kb), the perceptual degradation in the visual quality of the compressed images using the invention is imperceptible.

While the above description relates to image data, the same principle can be applied to any other kind of digital data that is generated from taking samples of the original data. The invention, therefore, is equally applicable to pre-processing of image, video, audio or similar data for the sake of achieving gains in the compression of the said data. In addition, while the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method for compressing a piece of video content, the method comprising:
   suppressing one or more least significant raw data portions in a piece of video content to generate a pre-processed piece of video content; and
   compressing the pre-processed piece of video content using discrete cosine transform based video compression that reduces the amount of data.

2. The method of claim 1, wherein each least significant data portion further comprises a bit-plane.

3. The method of claim 2, wherein suppressing one or more least significant raw data portions further comprises removing the one or more least significant bit-planes.

4. The method of claim 1, wherein suppressing one or more least significant raw data portions further comprises setting a plurality of bits in the one or more least significant bit-planes to a single value that is one of "1" and "0".

5. The method of claim 1, wherein the discrete cosine transform based video compression is one of motion JPEG, motion JPEG 2000, H.263, MPEG-4 and H.264.

6. A method for decompressing a compressed piece of video content, the method comprising:
   decompressing a compressed piece of video content using discrete cosine transform based video compression to generate a decompressed piece of content wherein the compressed piece of video content had been pre-processed to suppress one or more least significant unconverted data portions; and
   regenerating the suppressed one or more least significant data portions.

7. The method of claim 6, wherein the one or more least significant data portions further comprises one or more bit-planes.

8. The method of claim 7, wherein regenerating the suppressed one or more least significant data portions further comprises inserting a number of least significant bit-planes into the decompressed piece of video content based on the number of least significant bit-planes removed from an original piece of video content that was compressed.

9. The method of claim 8, wherein the inserting a number of least significant bit-planes further comprises distributing a plurality of bits in each least significant bit-plane.

10. The method of claim 9, wherein distributing the plurality of bits further comprises one of inserting "0" bits into the least significant bit-plane, inserting "1" bits into the least significant bit-plane and inserting random bit into the least significant bit-plane.

11. The method of claim 6, wherein the discrete cosine transform based video compression is one of motion JPEG, motion JPEG 2000, H.263, MPEG-4 and H.264.

12. A method for pre-processing a piece of video content so that the piece of video content is more efficiently compressed, the method comprising:
   receiving a piece of video content wherein the piece of video content has one or more data portions including one or more least significant data portions; and
   suppressing one or more least significant raw data portions in the piece of video content to generate a pre-processed piece of content that is compressed using discrete cosine transform based video compression that reduces the amount of data.

13. The method of claim 12, wherein each least significant data portion further comprises a bit-plane.

14. The method of claim 13, wherein suppressing one or more least significant data portions further comprises removing the one or more least significant bit-planes.

15. The method of claim 13, wherein suppressing one or more least significant data portions further comprises setting a plurality of bits in the one or more least significant bit-planes to a single value and the single value is one of "1" and "0".

16. The method of claim 12, wherein the discrete cosine transform based video compression is one of motion JPEG, motion JPEG 2000, H.263, MPEG-4 and H.264.

17. An apparatus for compressing a piece of video content, the apparatus comprising:
   a hardware-based pre-processing unit that receives a piece of video content, the pre-pocessing unit configured to suppress one or more least significant unconverted data portions in the piece of video content to generate a pre-processed piece of content; and
   a hardware-based encoding unit, coupled to the pre-processing unit, the encoding unit configured to compress the pre-processed piece of video content using discrete cosine transform based video compression that reduce the amount of data.

18. The apparatus of claim 17, wherein each least significant data portion further comprises a bit-plane.

19. The apparatus of claim 18, wherein the pre-processing unit is configured to remove the one or more least significant bit-planes.

20. The apparatus of claim 18, wherein pre-processing unit is configured to set a plurality of bits in the one or more least significant bit-planes to a single value and the single value is one of "1" and "0".

21. The apparatus of claim 17, wherein the discrete cosine transform based video compression is one of motion JPEG, motion JPEG 2000, H.263, MPEG-4 and H.264.

22. An apparatus for decompressing a compressed piece of video content, the apparatus comprising:
- a hardware-based decoding unit that is configured to decompress a compressed piece of video content using discrete cosine transform based video compression wherein the compressed piece of video content, which had been pre-processed to suppress one or more least significant raw data portions, is decoded to generate a decompressed piece of video content; and
- a hardware-based post-processing unit configured to regenerate the suppressed one or more least significant data portions.

23. The apparatus of claim 22, wherein the one or more least significant data portions further comprises one or more bit-planes.

24. The apparatus of claim 23, wherein the post-processing unit is configured to insert a number of least significant bit-planes into the decompressed piece of content based on the number of least significant bit-planes removed from an original piece of content that was compressed.

25. The apparatus of claim 24, wherein the post-processing unit is configured to distribute a plurality of bits in each least significant bit-plane.

26. The apparatus of claim 25, wherein the post-processing unit is configured to insert "0" bits into the least significant bit-plane, insert "1" bits into the least significant bit-plane or insert random bit into the least significant bit-plane.

27. The apparatus of claim 22, wherein the discrete cosine transform based video compression is one of motion JPEG, motion JPEG 2000, H.263, MPEG-4 and H.264.

28. An apparatus for pre-processing a piece of video content so that the piece of video content is more efficiently compressed, the apparatus comprising:
- a hardware-based pre-processing unit configured to receive a piece of video content wherein the piece of video content has one or more data portions including one or more least significant raw data portions; and
- wherein the hardware-based pre-processing unit is also configured to suppress one or more least significant raw data portions in a piece of video content to generate a pre-processed piece of video content that is compressed using discrete cosine transform based video compression that reduces the amount of data.

29. The apparatus of claim 28, wherein each least significant data portion further comprises a bit-plane.

30. The apparatus of claim 29, wherein the pre-processing unit is configured to remove the one or more least significant bit-planes.

31. The apparatus of claim 29, wherein the pre-processing unit is configured to set a plurality of bits in the one or more least significant bit-planes to a single value and the single value is one of "1" and "0".

32. The apparatus of claim 28, wherein the discrete cosine transform based video compression is one of motion JPEG, motion JPEG 2000, H.263, MPEG-4 and H.264.

* * * * *